C. E. BROWN.
AUTOMATIC CONTROLLING DEVICE FOR ELECTRIC CIRCUITS.
APPLICATION FILED MAR. 8, 1918.

1,331,316. Patented Feb. 17, 1920.
3 SHEETS—SHEET 2.

Inventor
C. E. Brown,
By Victor J. Evans
Attorney

WITNESSES
C. F. Rudolph

C. E. BROWN.
AUTOMATIC CONTROLLING DEVICE FOR ELECTRIC CIRCUITS.
APPLICATION FILED MAR. 8, 1918.

1,331,316.

Patented Feb. 17, 1920.
3 SHEETS—SHEET 3.

WITNESSES
C. F. Rudolph

Inventor
C. E. Brown.

By Victor J. Evans
Attorney

UNITED STATES PATENT OFFICE.

CLARENCE E. BROWN, OF CLARKSBURG, WEST VIRGINIA.

AUTOMATIC CONTROLLING DEVICE FOR ELECTRIC CIRCUITS.

1,331,316. Specification of Letters Patent. Patented Feb. 17, 1920.

Application filed March 8, 1918. Serial No. 221,338.

*To all whom it may concern:*

Be it known that I, CLARENCE E. BROWN, a citizen of the United States, residing at Clarksburg, in the county of Harrison and State of West Virginia, have invented new and useful Improvements in Automatic Controlling Devices for Electric Circuits, of which the following is a specification.

This invention relates to automatic controlling devices for electric circuits, and the object is to provide automatic means for controlling a motor circuit, especially designed for use in connection with a motor employed for turning the flattening stones in an establishment where window glass is manufactured.

It is now customary to employ men for turning the stones by hand when the regular force is absent, in order to prevent any cracking of the stones and the loss incident thereto. It is obvious that the device herein described may be employed in many other connections for controlling electric circuits, and I do not limit myself in this respect.

Briefly described, the apparatus includes a tank into which water is allowed to flow constantly in limited quantities during the period in which the apparatus is in operation, a float and means controlled by the float and including a gravity device for opening and closing the motor circuit, and means for giving an alarm when the water rises above or falls below the predetermined level.

The invention consists in the novel construction, combination, and arrangement of elements hereinafter described and claimed.

In the drawings,

Figure 1 is a view in side elevation and vertical section, showing the switches to be controlled, and the float valve and elements associated therewith, but omitting the electric circuits.

Fig. 5 is a diagrammatic view of the circuits and the apparatus with which the circuits are connected.

Figure 2:
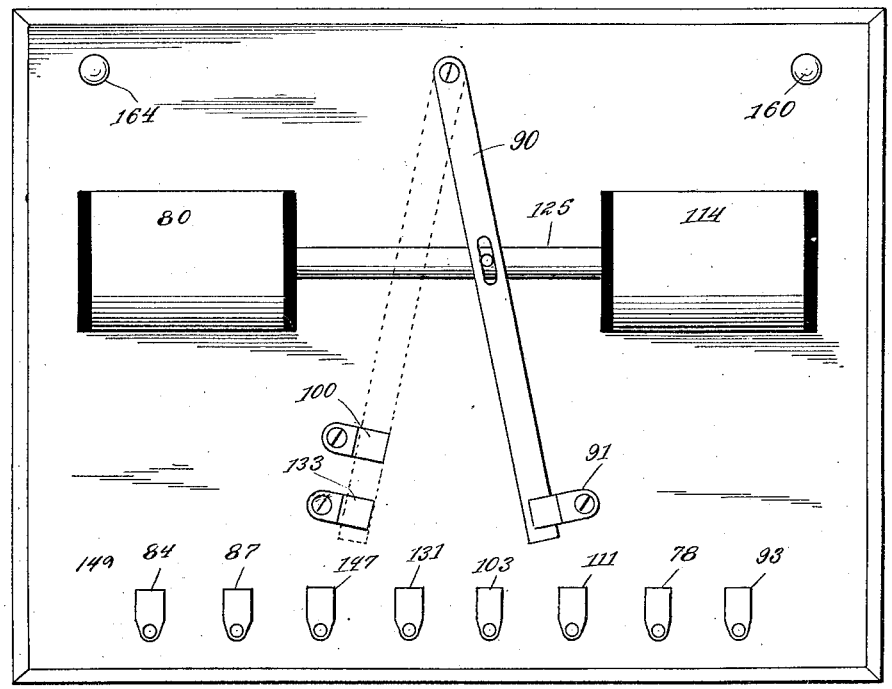
Fig. 2 shows a plurality of coils, in elevation, with a contact making arm controlled thereby.

The intermittent operation of the motor for the purpose indicated is effected as follows:

Water is admitted to pipe 10, controlled by valve 11, passing through any suitable filtering material 12 into tank 13, and thence to pipe 14, controlled by valve 15. Another valve 16, in this pipe 14 may be set in any desired position in order to provide for the flow of a predetermined quantity of water in a given interval. The series of graduations 17 is provided for the purpose indicated.

Water passes thence into tank 18, and raises the glass float 19, the latter being provided with a stem 20 carried between rollers 21, the stem carrying a head 22 having concave surface 23 supporting a metallic ball 24.

A chute 25, is inclined as shown and terminates at a point near a guiding device 26 within which the head 22 operates. Another chute 28 is inclined in the opposite direction and terminates at the left hand end as shown in the drawings at a point slightly above the left hand portion of chute 25, but at a point spaced from the extreme end thereof. A roller 30, located above the upper end of chute 28 is engaged by the ball 24, and when the head 22 is raised to the required height by the float the ball is deflected toward the chute 28 and rolls down that chute.

A plurality of spaced conductors 31 and 32 are mounted in chute 28, and the ball 24 completes a circuit during its movement through the chute. Conductors 34 and 35 are similarly located in chute 25 and a circuit is completed between those conductors when the ball travels down chute 25 after being discharged from chute 28.

When the circuit is completed in chute 28, the switch A being closed, coil 38 is energized and the lever 39 is swung toward the right, closing switch B and switch C; switch "A" being connected with the bar 37 directly controlling switch "C", and said bar 37 being connected with a link 40 controlling switch "B". The circuit for energizing coil 38, above indicated is through wire 41, coil 38, wire 42, wire 42' fuse block 43, wire 44, to lead line 45. The other lead line 46 is connected with resistance 47, wire 48, fuse block 43, wire 49, wire 50, switch "A", wire 51, wire 52, and wire 32 in chute 28.

At the time lever 39 closes switches B and C, connecting bar 55 is operated and this nected with wire 52, by means of wire 168, and is connected with wire 42 passing through the fuse block by means of wire 169, being in the circuit closed by means of switch A.

The pilot lamps 160, 164, are connected by wire 165, and the circuit is from lead wire 85, through plate 149, wire 166, lamp 164, wire 165, lamp 160, wire 161, wire 102, contact 100, arm 90, bracket 89, wire 88, plate 87, and lead wire 86.

The brass linings for the solenoids are designated 175.

In operation, water passes into tank 18, raising float 19 until the ball 24 is carried by head 22 to the point where it will discharge into chute 28, completing the circuit between conductors 31, 32, switch A being closed.

Coil 38 is thereby energized and arm 39 is moved to the right for closing switches B and C and opening switch A. At this time and by reason of the shifting of arm 39, bar 55 and link 56 open valve 58, and a given amount of water is discharged, so that the float and head 22 will fall, and the latter will be opposite the lower end of chute 25 when the ball has traveled the length of the chute.

The closing of switch C places a circuit in condition to be closed by ball 24 as it passes down chute 25 and between wires 34 and 35. This results in energizing coil 62 and throws arm 39 to the left, restoring switches A, B, and C to the position shown in Figs. 1 and 5.

Figure 3:
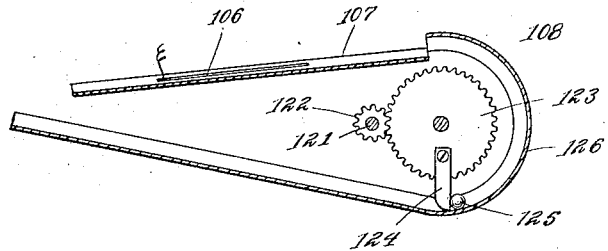
Fig. 3 is a vertical section of a device for controlling the motor circuit.
Figure 4:
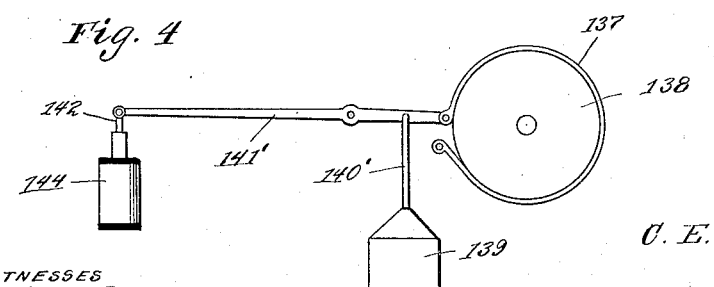
Fig. 4 is an elevation of a gravity and electrically operated brake.
Figure 3:
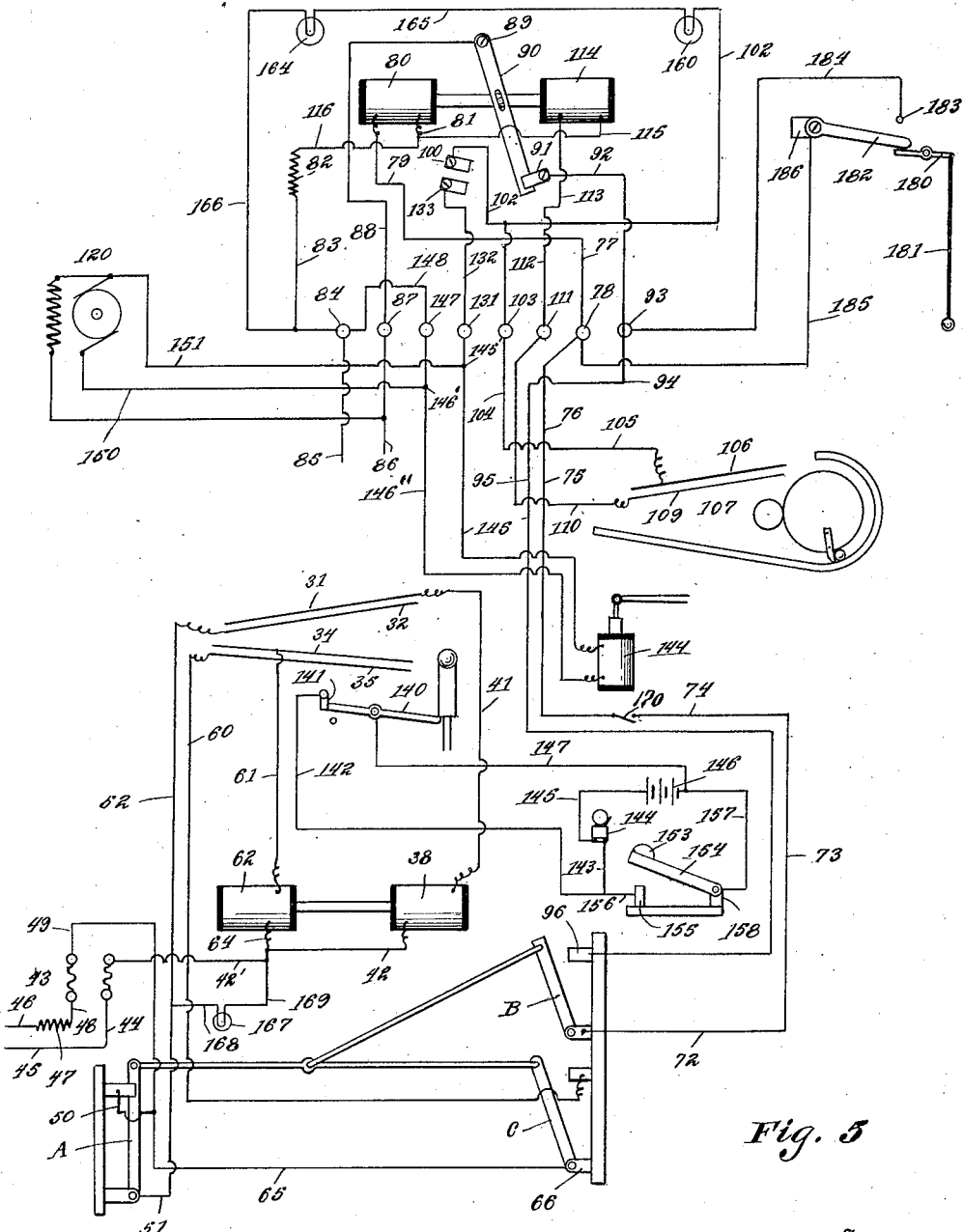

When switch B was closed, a circuit was completed through coil 80, throwing switch arm 90 into engagement with contact 100 for completing the motor circuit. This circuit is broken when switch arm 90 is thrown back and disengages contact 100—this return movement being due to the enerization of coil 114 connected with conductors 106 and 107 of the motor controlling device of Fig. 3, already described.

The entire operation here described is repeated when the water again rises sufficiently in tank 18 to cause the float to raise ball 24 to the upper end of chute 28. Valve 58 closed when arm 39 moved to the left.

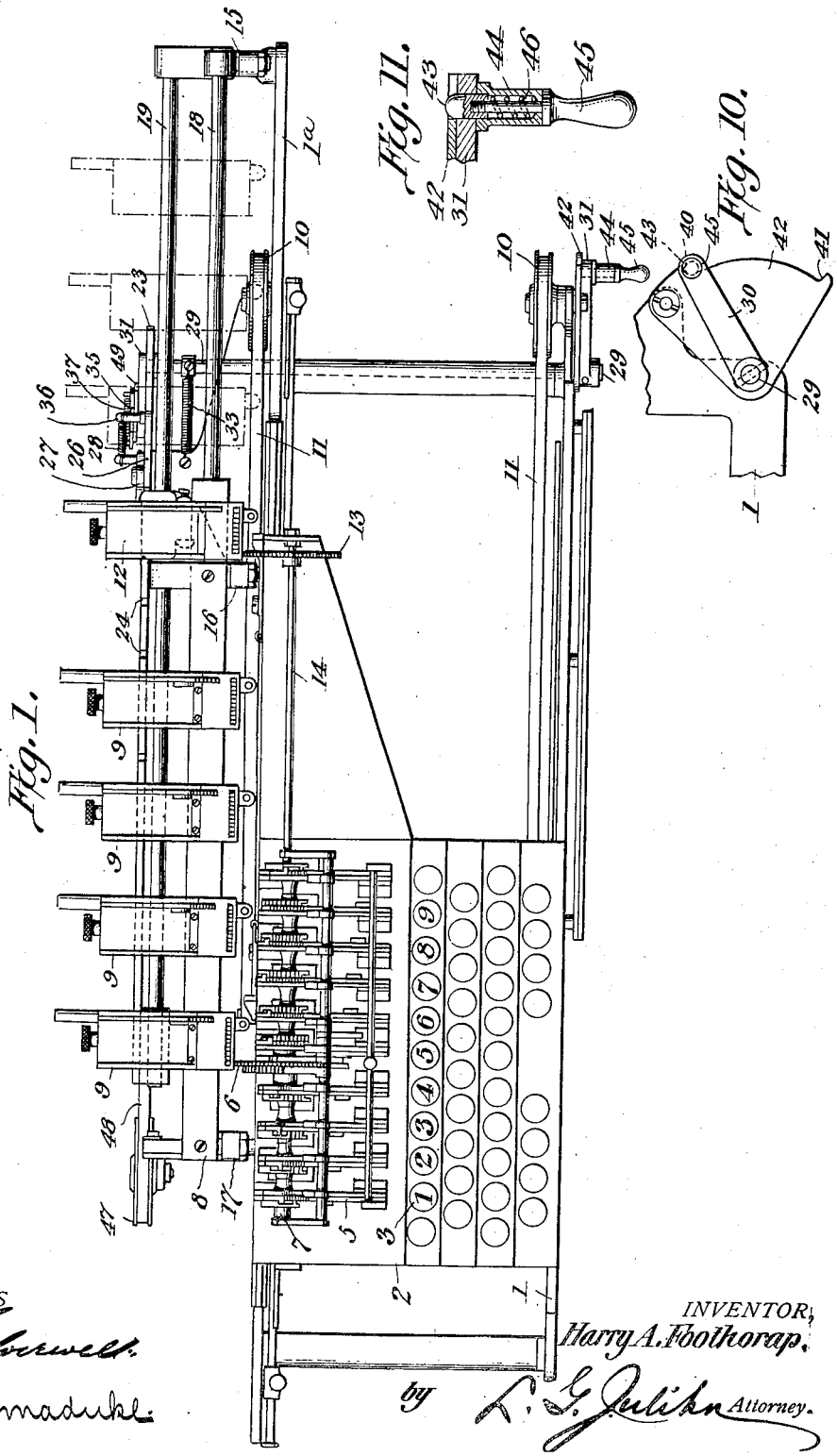

What is claimed is:

1. In a device of the class described, a tank, means for discharging a given quantity of water to flow into said tank in a given time, a float in the tank, a gravity device controlled by the float, a plurality of inclined members spaced apart, electrical conductors in each of said members, the gravity device being adapted to bridge the conductors in either inclined member for forming an electrical connection, and means controlled by each pair of conductors for controlling the circuit of an electric motor.

2. In a device of the class described, a motor, a bar constituting the core of a plurality of solenoid coils, means controlled by the coil of one of the solenoids for placing the motor in operation, said means being controlled by the coil of the other of said solenoids for throwing the motor out of operation, a second bar constituting a core, and a plurality of solenoid coils for the core last named, a plurality of switches, means connected with all of said switches and controlled by the bar last mentioned, opening certain of the switches and simultaneously closing others of said switches, and means for energizing each of the coils independently and including wires connected with the switches controlled by the second core and connected with the solenoid coils first named, said means last mentioned including a liquid-level and gravity-controlled device and a plurality of pairs of conductors, each pair being connected with one of the coils last named, and the gravity device bridging the conductors of each pair.

In testimony whereof I affix my signature.

CLARENCE E. BROWN.